(12) United States Patent
Steinberger et al.

(10) Patent No.: US 10,923,850 B2
(45) Date of Patent: Feb. 16, 2021

(54) DEVICE FOR SECURING AN OBJECT ON A RAIL

(71) Applicant: Woehner GmbH & Co., KG Elektrotechnische Systeme, Roedental (DE)

(72) Inventors: Philipp Steinberger, Coburg (DE); Joram Masel, Kronach (DE)

(73) Assignee: WOEHNER GMBH & CO., KG ELEKTROTECHNISCHE SYSTEME, Roedental (DE)

( * ) Notice: Subject to any disclaimer, the term of this patent is extended or adjusted under 35 U.S.C. 154(b) by 117 days.

(21) Appl. No.: 16/099,588

(22) PCT Filed: May 16, 2017

(86) PCT No.: PCT/EP2017/061675
§ 371 (c)(1),
(2) Date: Nov. 7, 2018

(87) PCT Pub. No.: WO2017/198643
PCT Pub. Date: Nov. 23, 2017

(65) Prior Publication Data
US 2019/0148870 A1 May 16, 2019

(30) Foreign Application Priority Data

May 17, 2016 (EP) ..................................... 16169977
Sep. 30, 2016 (EP) ..................................... 16191898

(51) Int. Cl.
*H01R 13/447* (2006.01)
*H01R 9/28* (2006.01)
(Continued)

(52) U.S. Cl.
CPC ......... *H01R 13/447* (2013.01); *H01R 9/2458* (2013.01); *H01R 9/28* (2013.01);
(Continued)

(58) Field of Classification Search
CPC ...... H01R 13/447; H01R 9/2458; H01R 9/28; H01R 13/506; H01R 25/162;
(Continued)

(56) References Cited

U.S. PATENT DOCUMENTS 3,009,011 A 11/1961 Fisher
3,018,320 A 1/1962 Rowe
(Continued)

FOREIGN PATENT DOCUMENTS

CN 1751422 A 3/2006
CN 102570317 A 7/2012
(Continued)

OTHER PUBLICATIONS

Machine Translation WO 2013054873, publication date Apr. 18, 2013, [database online], [retrieved on May 12, 2020] (Year: 2013).*
(Continued)

*Primary Examiner* — Travis S Chambers
(74) *Attorney, Agent, or Firm* — Maginot, Moore & Beck, LLP

(57) ABSTRACT

Device for securing an object on a rail, having an elongated base body which may be placed transversely on the rail and which at one end comprises an integrated actuating element which, when actuated by a user, moves opposing latching hooks which are integrated in the actuating element and are suitable for engaging behind the rail, in opposite directions.

15 Claims, 3 Drawing Sheets

(51) Int. Cl.
*H02B 1/052* (2006.01)
*H02B 1/056* (2006.01)
*H01R 13/506* (2006.01)
*H01R 25/16* (2006.01)
*H01R 9/24* (2006.01)
*H02B 1/044* (2006.01)
*H01R 13/66* (2006.01)

(52) U.S. Cl.
CPC ......... *H01R 13/506* (2013.01); *H01R 25/162* (2013.01); *H02B 1/044* (2013.01); *H02B 1/052* (2013.01); *H02B 1/056* (2013.01); *H02B 1/0523* (2013.01); *H01R 13/6691* (2013.01)

(58) Field of Classification Search
CPC .. H01R 13/6691; H01R 9/2608; H01R 25/14; H01R 25/142; H01R 9/26; H01R 4/64; H02B 1/044; H02B 1/052; H02B 1/0523; H02B 1/056
USPC .................................. 439/709, 94, 532, 716
See application file for complete search history.

(56) References Cited

U.S. PATENT DOCUMENTS

| | | | |
|---|---|---|---|
| 3,096,131 A | 7/1963 | Adams | |
| 3,182,381 A | 5/1965 | Johnston et al. | |
| 3,183,299 A | 5/1965 | Johnston et al. | |
| 3,212,403 A | 10/1965 | Hermann et al. | |
| 3,268,848 A | 8/1966 | Adams et al. | |
| 3,346,776 A | 10/1967 | Olashaw | |
| 3,634,810 A | 1/1972 | Pemberton | |
| 4,567,654 A | 2/1986 | Kloenne et al. | |
| 4,878,859 A * | 11/1989 | Haller | H01R 9/2608 439/716 |
| 5,803,772 A * | 9/1998 | Muller | H01R 9/2608 439/716 |
| 5,842,889 A * | 12/1998 | Kollmann | H02B 1/052 439/716 |
| 6,431,909 B1 * | 8/2002 | Nolden | H01R 9/2608 361/735 |
| 7,575,484 B2 * | 8/2009 | Van Der Mee | H01R 9/2608 439/716 |
| 7,980,891 B2 * | 7/2011 | Molnar | H02B 1/052 361/735 |
| 10,367,295 B2 * | 7/2019 | Huang | H05K 7/14 |
| 2006/0121796 A1 | 6/2006 | Josten et al. | |
| 2007/0228826 A1 | 10/2007 | Jordan et al. | |
| 2013/0337680 A1 * | 12/2013 | Schlegel | A61G 13/1295 439/532 |

FOREIGN PATENT DOCUMENTS

| | | |
|---|---|---|
| CN | 104682071 A | 6/2015 |
| DE | 3424482 A1 | 1/1986 |
| DE | 3933703 A1 | 4/1991 |
| DE | 69010755 T2 | 12/1994 |
| DE | 4327715 A1 | 2/1995 |
| DE | 29505258 U1 | 7/1995 |
| DE | 19957277 A1 | 5/2001 |
| DE | 10 2013 103 544 A1 | 10/2014 |
| DE | 20 2015 106 673 U1 | 2/2016 |
| EP | 0345851 A1 | 12/1989 |
| EP | 1337005 A1 | 8/2003 |
| EP | 1351336 A1 | 10/2003 |
| EP | 1672743 A1 | 6/2006 |
| EP | 1742315 A1 | 1/2007 |
| EP | 1764872 A2 | 3/2007 |
| EP | 2 863 496 A1 | 4/2015 |
| JP | S6215795 A | 1/1987 |
| WO | 2004057716 A1 | 7/2004 |
| WO | 2004073127 A1 | 8/2004 |
| WO | 2013054873 A1 | 4/2013 |

OTHER PUBLICATIONS

Machine Translation DE 20 2015 106 673, publication date Feb. 25, 2016, [database online], [retrieved on May 13, 2020] (Year: 2016).*
European Search Report corresponding to European application No. 16169977.2, dated Oct. 27, 2016, (9 pages).
International Search Report corresponding to International Appl. No. PCT/EP2017/061675, dated Aug. 1, 2017, (11 pages).

* cited by examiner

DEVICE FOR SECURING AN OBJECT ON A RAIL

This application is a 35 U.S.C. 371 National Stage application of PCT/EP2017/061675, filed May 16, 2017, and claims priority to European Application No. EP 16169977.2, filed on May 17, 2016 and European Application No. EP 16191898.2, filed on Sep. 30, 2016. The entire contents of the above-mentioned patent applications are incorporated herein by reference as part of the disclosure of this U.S. application.

The invention relates to a device, in particular a latching element, for securing an object on a rail, for example a hat rail or busbar.

In numerous applications it is necessary to mount one or more objects on rails, for example hat rails or busbars. The object may, for example, be an electrical module or electrical device which is supplied with electrical power by means of the rail or another rail.

The mounting of objects, for example by means of screws or adapter devices on rails, is tedious and time-consuming with conventional mounting systems.

It is therefore an object of the present invention to provide a device for securing an object on a rail, in which the attachment and removal of an object to and from the rail may be performed without any effort and in a short time.

This object is achieved by a device for securing an object on a rail with the features defined in patent claim 1.

The invention therefore provides a device for securing an object on a rail having an elongated base body which may be placed transversely on the rail and which at one end comprises an integrated actuating element which, when actuated by a user, moves opposing latching hooks which are integrated in the actuating element and are suitable for engaging behind the rail, in opposite directions.

The device in accordance to the invention provides the advantage that the object may be easily mounted on a rail and secures the object on the rail.

The device in accordance to the invention also provides the advantage that a mounted object already on a rail may be quickly and easily removed from the rail.

The time required for mounting or dismounting an object on or from a rail is minimized by the device in accordance to the invention.

In the case of a possible embodiment of the device in accordance to the invention, a first latching hook may be moved in one direction of actuation of the actuating element, and a second latching hook may be moved in the opposite direction to the direction of actuation of the actuating element.

In another possible embodiment of the device in accordance to the invention, the second latching hook is moved in the opposite direction to the actuating direction of the actuating element by a deflecting element integrated in the device.

In the case of a possible embodiment of the device in accordance with the invention, the deflecting element comprises a deflecting lever which is integrally formed on the device.

In another possible embodiment of the device in accordance to the invention, the deflection lever is formed onto the device by means of a meandering connection.

In another possible embodiment of the device in accordance to the invention, the deflection lever is symmetrical and comprises a central support point.

In another possible embodiment of the device in accordance to the invention, the support point of the deflection lever is arranged on a longitudinal axis of the elongated base body of the device.

In another possible embodiment of the device in accordance to the invention, the deflection lever rotates around the support point when the actuating element is actuated, so that the second latching hook moves in the direction opposite to the direction of actuation.

In the case of a possible embodiment of the device in accordance to the invention, the opposing latching hooks each have integral return springs.

In another possible embodiment of the device in accordance to the invention, the return springs are integrated in the base body.

In another possible embodiment of the device in accordance to the invention, the return springs are formed by separate spring elements.

In the case of another possible embodiment of the device in accordance to the invention, the device is molded onto the object to be mounted on the rail.

In another possible embodiment of the device in accordance to the invention, the opposing latching hooks moved towards each other by the actuation of the actuating element engage behind the respective rail in a latching position of the device.

In another possible embodiment of the device in accordance to the invention, the opposing latching hooks moved away from each other by the actuation of the actuating element release the rail in a parking position to release the device from the rail.

In another possible embodiment of the device in accordance to the invention, the latching hooks are configured in such a way that they engage behind rails of different height or thickness.

In another possible embodiment of the device in accordance to the invention, the actuating element of the device may be operated by a user using a screwdriver.

In another possible embodiment of the device in accordance to the invention, the elongated base body of the device is made of plastic material.

Furthermore, possible embodiments of the securing device in accordance to the invention for securing an object on a rail are described with reference to the enclosed figures.

Figure 1:
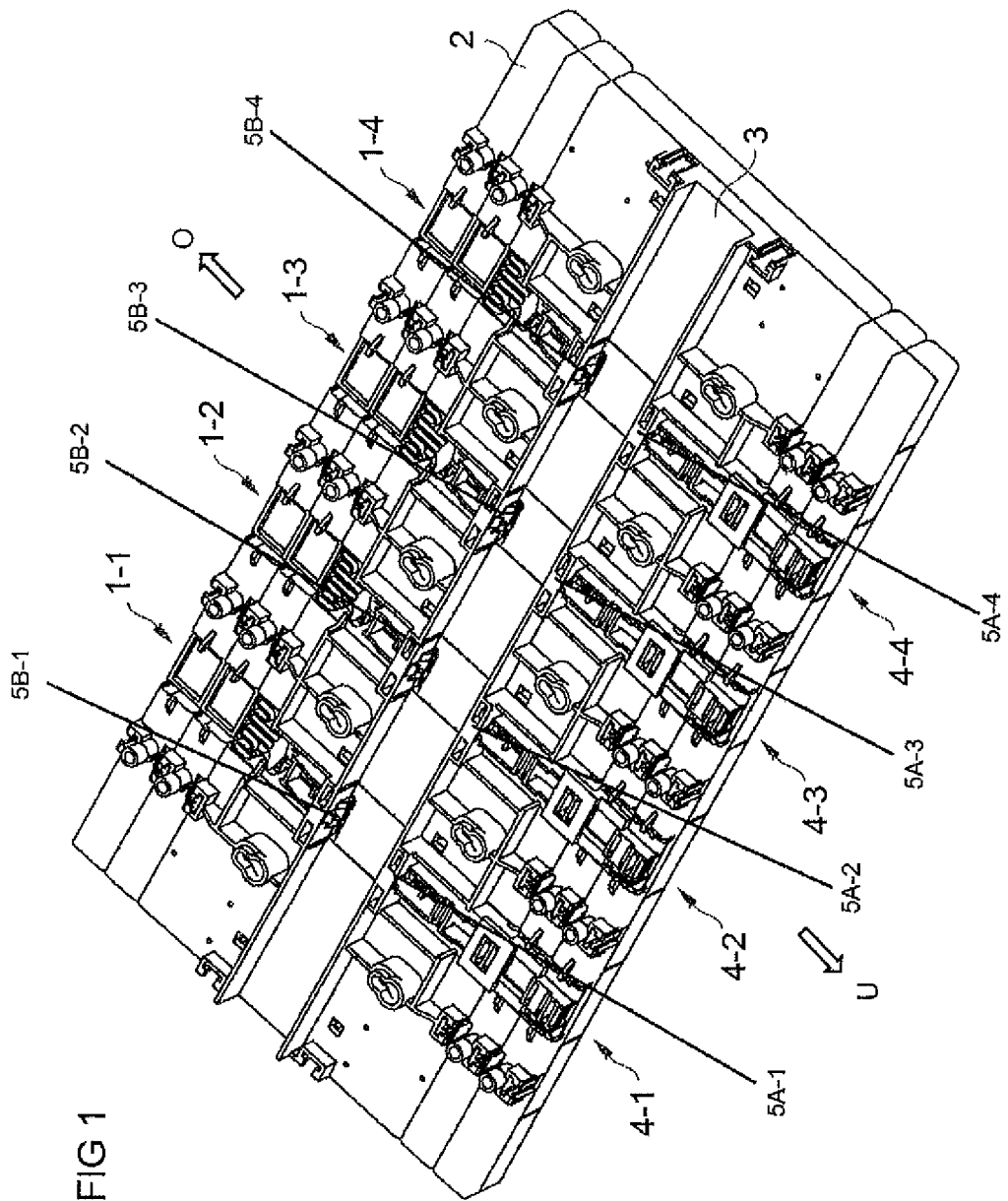
FIG. 1 is a perspective view from behind of a possible embodiment of a contact protection base plate module of a busbar system, which has securing devices in accordance with the invention, as an exemplary application.

FIG. 1 shows, in an exemplary embodiment, an object which may be attached to a rail by several securing devices formed on the object. In the exemplary embodiment shown in FIG. 1, several securing devices 1 are integrally formed on a lower part of a base plate module 2, which is to be mounted on a rail, for example a mounting rail. FIG. 1 shows a perspective view of the lower part of the base plate module 2 from the rear i.e. from the backside. In the exemplary embodiment shown, the lower part of the base plate module 2 comprises a recess or a contour 3 for placing the contact protection base plate module 2 on a mounting rail. Furthermore, in the exemplary embodiment shown, the base plate module 2 comprises four integrated or formed-onto securing devices 1 arranged transversely to the recess contour 3 for securing the base plate module 2 as an object on the mounting rail. In the exemplary embodiment shown in FIG. 1, the various securing devices 1 are integrated in the object or molded onto the object. In the exemplary embodiment shown, the object is a base plate module 2, in particular a contact protection base plate module, which may be used in a busbar system. In the exemplary embodiment shown in FIG. 1, the recess or recess contour 3 runs centrally in the middle in a longitudinal direction of the base plate module 2, as shown in FIG. 1. The base plate module 2 may be placed on a mounting rail, in particular a top-hat rail, and then latched onto the rail using the securing devices 1-1, 1-2, 1-3, 1-4 in accordance to the invention. In the exemplary embodiment shown, the object 2 or baseplate module 2 to be mounted comprises four different securing devices 1 spaced evenly apart to secure object 2 on the respective rail. As may be seen from FIG. 1, the various securing devices 1-1, 1-2, 1-3, 1-4 are elongated and run transversely to contour 3 or, in the latched-on condition, transversely to the corresponding rail. Each of the four different 1-$i$ securing devices comprises an integrated actuating element 4-$i$ on one end. When actuated by a user, the latching hooks 5A-$i$, 5B-$i$ provided on the actuating element are moved, which are suitable for engaging behind the rail. A first latching hook may be moved in one actuating direction of the actuating element, and a second latching hook in the opposite direction to the actuating direction of the actuating element. In the exemplary embodiment shown in FIG. 1, each of the securing devices 1-1, 1-2, 1-3, 1-4 formed on object 2 comprises an associated actuating element 4-1, 4-2, 4 3, 4-4. In the exemplary embodiment shown in FIG. 1, all four actuating elements 4-1 to 4-4 are located on one longitudinal side of object 2 to be attached to the mounting rails or of the base plate module to be attached to the mounting rails. The actuating elements 4-$i$ may therefore be easily accessed by a user during mounting and operated using a tool, in particular a screwdriver.

In the exemplary embodiment shown in FIG. 1, each securing device 1-$i$ is provided with corresponding latching hooks 5A, 5B arranged opposite to each other. On one side of contour 3 there are first latching hooks 5A-1, 5A-2, 5A-3, 5A-4, which may be moved in one actuating direction of the associated actuating elements 4-1, 4-2, 4-3, 4-4. In the exemplary embodiment shown in FIG. 1, the various actuating elements 4-$i$ are arranged on the lower longitudinal side of the base plate module 2 to be mounted. If the actuating elements 4-$i$ are pulled downwards (U) using a screwdriver, for example, the first latching hooks 5A-$i$ of the various securing devices 1-$i$ are also moved downwards in accordance with the direction of movement of the actuating element. On the opposite side of contour 3 are the opposing second latching hooks 5B-1, 5B-2, 5B-3, 5B-4 of the various securing devices 1-$i$. When actuating the actuating elements 4-$i$, these second latching hooks are moved in the opposite direction to the actuating direction of the actuating element 4-$i$. If, for example, the actuating elements 4-$i$ are pulled or moved downwards using a screwdriver, the second latching hooks 5B-$i$ of the securing devices 1-$i$ move in the opposite direction, i.e. upwards (O). The opposing latching hooks 5A-$i$, 5B-$i$, which are moved away from each other by actuating the actuating elements 4-$i$, reach a parking position or release position in which the rail is released to release the device 1 from the respective rail. An end stop preferably prevents the actuating element 4-$i$ from being pulled out excessively, for example when using a screwdriver. FIG. 1 shows the base plate module 2 with several securing devices 1-$i$, each being in a release or parking position. Starting from this parking position, the base plate module 2 may be placed on a mounting rail and then be mounted. For this purpose, the base plate module 2 is placed on the mounting rail as an object to be attached or secured in its intended mounting contour 3 and then the actuating elements 4-$i$ of the securing devices 1-$i$ provided on the lower longitudinal side are pulled downwards by means of a screwdriver such that the latching hooks of the various securing devices 1-$i$ move towards one another until a latching position is reached in which the opposing latching hooks engage behind the mounting rail.

Figure 2:
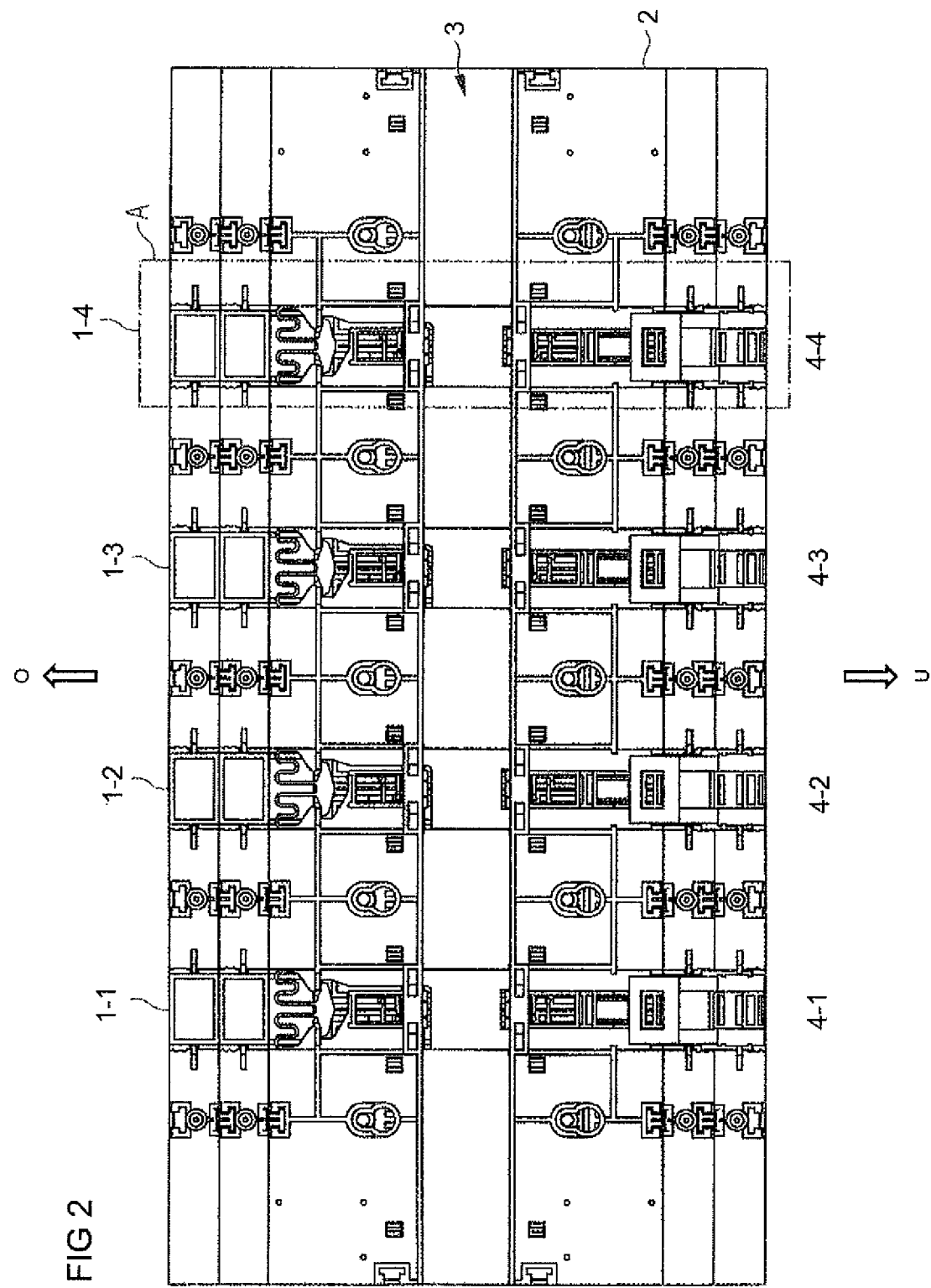
FIG. 2 is a frontal view of the contact protection base plate module shown in FIG. 1 from behind, wherein the contact protection base plate module is latched onto a busbar in a latch-in position.

FIG. 2 shows a frontal view of the object or base plate module 2 to be mounted from the rear of the base plate module 2. One may see the receiving contour for the mounting rail running in the center of the longitudinal direction of the base plate module 2. At right angles to the longitudinal contour 3 and thus to the rail, four uniformly spaced securing devices 1-$i$ are provided for mounting the base plate module 2 on the mounting rail. The number and spacing of the various securing devices 1-$i$ can vary depending on the weight and load of the object 2 to be attached. Each of the securing devices 1-$i$ comprises at least two latching hooks facing each other which are suitable for engaging behind the respective rail and which move in opposite directions when the respective actuating element 4-$i$ of the securing device 1-$i$ is actuated.

Figure 3:
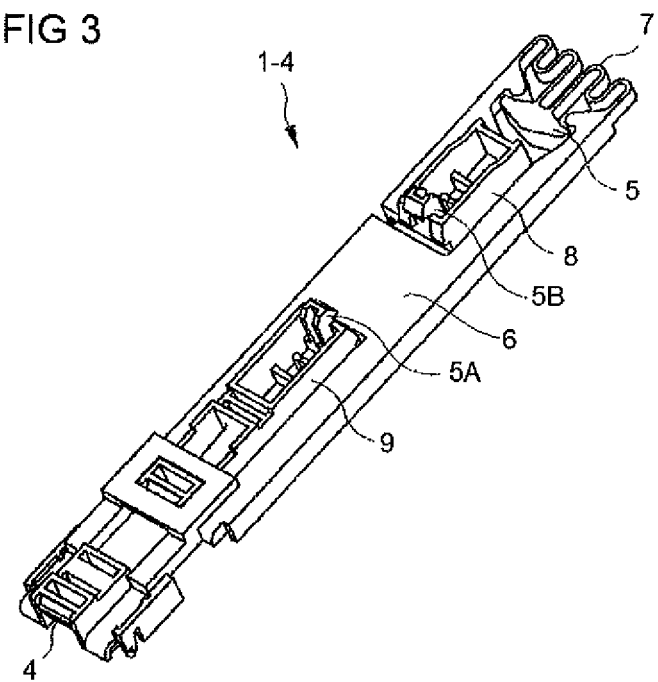
FIG. 3 shows a section of a securing device in accordance to the invention attached to the contact protection baseplate module as shown in FIGS. 1, 2 to secure the baseplate module to a rail.
Figure 4:
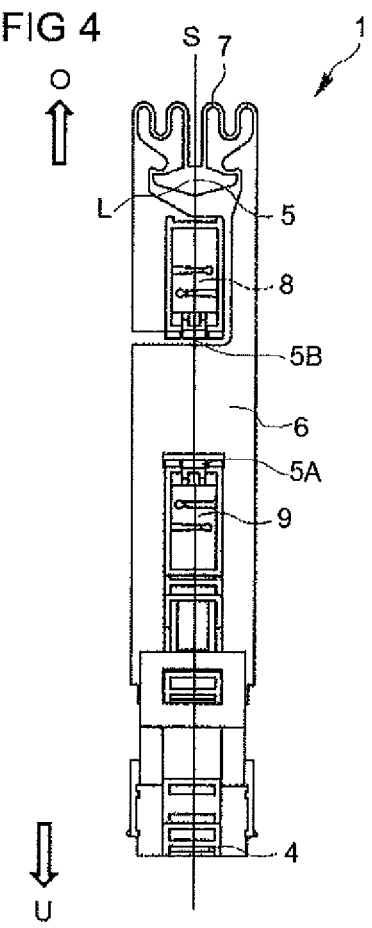
FIG. 4 shows a frontal view of the securing device shown in FIG. 3 for securing a base plate module on a rail.

FIG. 3 shows a perspective view of the fourth securing device 1-4 shown in FIG. 2 as an example. Each of the different securing devices 1-$i$ shown in FIG. 1, 2 preferably comprise the same shape as the securing device 1-4 shown in FIG. 3. FIG. 4 shows a frontal view of the securing device 1 shown in FIG. 3. In the exemplary embodiment shown in FIGS. 3, 4, the latching element or securing device 1, which is used for mounting the base plate module 2 on a mounting rail, comprises a deflection lever 5 which is molded or injection-molded onto a base body 6 of the securing device 1 by means of a meander-shaped connection 7, and comprises a central support point 2. In the exemplary embodiment shown, the deflection lever 5 is integrated in the latching element or in the securing device 1 and formed using meander-shaped film hinges. The meander-shaped film hinges ensure maximum freedom of movement. In the exemplary embodiment shown, the latching element or securing device 1 also comprises integrated return springs 8, 9. Alternatively, external springing can also be provided by compression springs. In the exemplary embodiment shown in FIG. 4, the securing device 1 is symmetrically configured and comprises a symmetry axis S. The deflection lever 5 is also symmetrical and comprises a central support point L, which is preferably located on the symmetry axis S of the securing device 1. The support point L of the deflection lever 5 thus lies on the longitudinal axis or symmetry axis S of the elongated base body 6 of the securing device 1. When the actuating element 4 is actuated, the deflection lever 5 rotates around its support point L, so that the second latching hook 5B moves in the direction opposite to the actuating direction of the actuating element 4. The two opposing latching hooks 5A, 5B each have corresponding return springs 8, 9. In the exemplary embodiment shown in FIGS. 3, 4, the return springs 8, 9 are integrated in the base body 6 of the securing device 1. Alternatively, the return springs 8, 9 may also be formed by separate spring elements. The securing element or latching element 1 has an operating point or an actuating element 4 for operation by a user or operator. The latching element or the securing device 1 is configured in such a way that the deflection lever 5 molded-onto the securing device 1 deflects an operating or actuating movement from one side in such a way that the two latching hooks 5A, 5B move in opposite directions. When the actuating element 4 is actuated, the deflection lever 5 rotates around the support point L so that one of the opposing latching hooks moves in the opposite direction to the actuating direction. For example, if actuating element 4 is pulled downwards U, the first latching hook 5A on the side of actuating element 4 moves in the same direction, i.e. in the direction of actuation of actuating element 4, and the other opposing latching hook 5B moves in the opposite direction, i.e. upwards O. Conversely, if actuating element 4 is moved upwards (O) from an extended position, the first latching hook 5A moves in the same direction, i.e. also upwards, while the opposing second latching hook 5B moves downwards (U), until the two latching hooks reach a latching position in which they securely engage behind the rail. The two latching hooks 5A, 5B may engage behind a rail in a latched condition, in particular a DIN rail or mounting rail, so that the object or base plate module 2 may no longer be removed from the rail. If the latching element or the securing device 1 is actuated or pulled with a screwdriver with the aid of the actuating element 4, the integrally formed first latching hook 5A also moves simultaneously in the same direction, wherein at the same time the deflection lever 5 is moved rotatorily about the axis of rotation from the symmetrical central position shown in FIG. 4, wherein the other opposing latching hook 5B moves in the opposite direction. If, for example, the actuating device 4 is pulled further downwards, the securing device 1 or the latching element may latch into a parking position in a possible embodiment, so that when the object is mounted on a rail, the user must actively return the latching element or the securing device 1 to the latched position, for example by pushing the latching element back manually or using a screwdriver. The securing means formed by the latching elements or the securing device 1-*i* may be easily operated by the user by actuating the actuating elements 4-*i* located at the edge of the contact protection base plate module. One advantage of the double-sided acting latching element or securing element in accordance to the invention is that an object, for example a flat base plate module 2, may be placed frontally on a mounting rail or top-hat rail without tilting. This allows even very large plate modules or planar modules to be placed on a rail without any problems using the securing device 1 in accordance to the invention. In the case of a possible embodiment, the securing device 1 in accordance to the invention, in particular the elongated base body thereof is made of plastic material. In the exemplary embodiment shown in FIGS. 1 to 4, the securing device 1 in accordance to the invention is molded onto the object to be attached. In an alternative embodiment, the securing device 1 may be mechanically attached to the respective object, for example by latching or screwing it on. One or more securing devices 1 are screwed to a housing of the object to be attached, or they are attached by means of snap connections. The exemplary embodiment shown in FIGS. 1 to 4 shows that the object to be secured is a flat base plate module 2. In the case of alternative embodiments, the object to be secured may be any housing of a device, for example an electrical device, which may be attached to a mounting rail or busbar. In the exemplary embodiment shown in FIGS. 1 to 4, object 2 is mounted on a single rail because the object has a single corresponding mounting contour 3. It is also possible to mount object 2 on several rails, wherein the rails may be mounting rails and/or current-carrying rails. For example, the housing of an object to be mounted has contours for three busbars which run parallel to each other, wherein one or more securing devices 1 in accordance with the invention may be provided on each mounting contour 3. In the exemplary embodiment shown in FIG. 1, all actuating elements 4-*i* are arranged on one side. In an alternative embodiment, actuating elements for different securing devices 1 may be provided on different sides, for example on two opposite sides or longitudinal sides of an object, for example in order to actuate different securing devices 1 provided on different mounting contours. In the exemplary embodiment shown in FIGS. 1 to 4, the deflection lever 5 is integrated into the securing device 1. In an alternative embodiment, the deflection lever 5 may also be formed by a separate component. In this embodiment, the latching element or the securing device 1 is thus composed of several parts. In the case of a further possible embodiment, the latching position and/or parking position is visually displayed to the user. For example, in the object 2 to be mounted, for example the base plate module 2, a recess is provided at the front which, when the actuating device 4 is actuated and the deflection lever 5 is thus actuated, visually indicates whether the latching device or the securing device 1 is in a latching position or parking position. This is helpful for the user, because especially in case of planar objects or plate modules the user may not directly observe or see the position of the latching hooks 5A, 5B during the mounting of the object 2 to be attached. In the exemplary embodiment shown in FIGS. 1 to 4, the latching devices or securing devices 1-*i* are evenly spaced and fixed to the housing of the object. In an alternative embodiment, the securing devices 1-*i* may be manually moved lengthwise along a mounting contour 3, for example to secure mounting areas of the base plate module 2, to which heavier loads or devices are attached, or to safely transfer their weight to the mounting rail. With this embodiment, the securing devices 1-*i* may thus be displaced laterally in the longitudinal direction of the mounting contour 3 relative to the housing 2 of the object 2 to be mounted, wherein their distance from each other may be varied. In the case of a variation of a possible embodiment, the number of securing devices 1-*i* may be varied by the user, depending on the application and the load to be supported, by providing more or less securing devices 1-*i* on the base plate module 2 of the object to be secured. The securing device 1 in accordance to the invention is suitable for securing or fixing any objects on different rails, in particular load- or power-carrying rails. The securing device 1 in accordance to the invention is easy to use and allows a very fast mounting or de-mounting of an object on a rail.

REFERENCE NUMERALS

1 Device
2 Object to be secured
3 Contour
4 Actuating element
5A, 5B Latching hook
6 Base body
7 Connection
8, 9 Return springs

The invention claimed is:
1. A device for securing an object on a rail, the device comprising:

an elongated base body defining a longitudinal direction and configured to be placed transversely on the rail, said elongated base body including an integrated actuating element at one end thereof configured and operable, when actuated by a user, to move opposing latching hooks which are integrated in the actuating element, said opposing latching hooks configured and arranged to engage behind the rail, in opposite directions relative to each other, wherein a first latching hook of said opposing latching hooks is movable in an actuating direction of the actuating element, and a second latching hook of said opposing latching hooks is movable in an opposite direction to the actuating direction of the actuating element by a deflection lever integrated in the device, said deflection lever integrally formed on the device at an end of the elongated base body opposite said one end, wherein the deflection lever has a central support point, the deflection lever rotatably movable about said support point when the actuating element is actuated, and wherein the two opposing latching hooks are provided between the actuating element and the deflection lever in said longitudinal direction of the base body.

2. The device according to claim 1, wherein the deflection lever is mirror symmetrical.

3. The device according to claim 1, wherein the deflection lever moves rotatably about the support point when the actuating element is actuated, so that the second latching hook moves in the direction opposite to the actuating direction.

4. The device according to claim 1, wherein the device is integrally formed on the object to be mounted on the rail.

5. The device according to claim 1, wherein the opposing latching hooks are configured to be moved towards one another by actuation of the actuating element to engage behind the rail in a latching position.

6. The device according to claim 1, wherein the opposing latching hooks are configured to be moved away from each other by the actuation of the actuating element to release the rail in a parking position for releasing the device from the rail.

7. The device according to claim 1, wherein the latching hooks are configured to engage behind rails of different heights.

8. The device according to claim 1, wherein the actuating element is operable by a user by means of a screwdriver.

9. The device according to claim 1, wherein the elongated base body of the device is made of plastic.

10. The device according to claim 1, wherein the opposing latching hooks each include formed-on return springs.

11. The device according to claim 10, wherein the return springs are integrated into the base body or are formed by separate spring elements.

12. The device according to claim 1, wherein the deflection lever is integrally formed on the device by means of a meander-shaped connection.

13. The device according to claim 12, wherein the support point of the deflection lever is arranged on a longitudinal axis of the elongated base body.

14. The device according to claim 1, wherein the support point of the deflection lever is arranged on a longitudinal axis of the elongated base body.

15. The device according to claim 14, wherein the deflection lever moves rotatably about the support point when the actuating element is actuated, so that the second latching hook moves in the direction opposite to the actuating direction.

* * * * *